United States Patent [19]

Higginbotham et al.

[11] 4,234,253
[45] Nov. 18, 1980

[54] ATTENUATION MEASURING SYSTEM

[75] Inventors: John W. Higginbotham; Dennis L. Dowden, both of St. Louis, Mo.

[73] Assignee: McDonnell Douglas Corporation, St. Louis, Mo.

[21] Appl. No.: 33,530

[22] Filed: Apr. 26, 1979

[51] Int. Cl.³ .......................................... G01N 21/00
[52] U.S. Cl. .................................. 356/73.1; 356/435
[58] Field of Search ....................... 356/73.1, 434, 435

[56] References Cited

PUBLICATIONS

"Inst. For Testing Telecommunications Optical Fibres" Few; Optical Engineering; vol. 15 No. 3; May-Jun. 1976; pp. 241-243.

*Primary Examiner*—Vincent P. McGraw

*Attorney, Agent, or Firm*—Polster, Polster and Lucchesi

[57] ABSTRACT

A fiber optic attenuation measuring system includes a transmitter for generating and transmitting a reference signal from a first end of fiber optic cable, and a receiver positioned to receive the signal from a second end of the cable. The receiver compares the transmitted signal with a reference signal to determine attenuation through the cable under test. In the preferred embodiment of the invention, the transmitter and receiver are independent units, which may be positioned separately with respect to one another, and the receiver is constructed to enable it to reproduce the reference signal through the use of a timing pulse transmitted with the test signal from the transmitter. In the alternative, a reference cable may link the transmitter and receiver for comparison with the test transmission.

11 Claims, 3 Drawing Figures

ATTENUATION MEASURING SYSTEM

The government has rights in this invention pursuant to contract number N0019-76-C-0666 awarded by the Department of the Navy.

BACKGROUND OF THE INVENTION

This invention relates to a system for testing the attenuation of fiber optic cables. While the invention is described with particular reference to its use with aircraft systems, whose skilled in the art will recognize the wider applicability of the inventive principles disclosed hereinafter.

Fiber optic cables are finding increased application in a variety of products, including aircraft control systems. They are useful in aircraft, for example, because the cables are light weight, because the cables do not require special shielding in that cross coupling between adjacent cables or between other electromagnectic sources and a particular cable does not affect data transmission, and because the cables still retain the flexibility and pliability of more conventional electrical conductors. For all their above-described advantages, however, fiber optic cables are difficult to test reliably to ensure that the cable's integrity is intact or that its performance has not been subject to degradation in use. This difficulty is particularly true with respect to aircraft flight systems, where access to the cables often is restricted physically.

The invention disclosed hereinafter provides a relatively simple and effective device for testing the attenuation of a fiber optic conductor. In the preferred form of the invention, a separate transmitter and receiver are provided which are operatively connected at opposite ends of the cable under test. The transmitter is adapted to provide a test signal to the fiber optic conductor. A timing pulse also is generated and combined with the test signal for transmission. The amplitude of the timing pulse is higher than the test signal so that any cable whose attenuation is within the test range is automatically within the range of timing pulse recovery. The receiver separates the timing pulse from the test pulse and utilizes the timing pulse to demodulate the test signal to provide a DC level voltage proportional to the amplitude of the signal wave transmitted through the cable. This DC voltage is compared with a reference signal and any differences are displayed as attenuation to the receiver operator. Because the reference signals are generated in the respective transmitter and receiver of the system, no physical connection, except the cable under test, is required between the transmitter and the receiver. Alternatively, the transmitted signal may be passed both through the cable under test and a reference cable, and then compared in the receiver to establish the attenuation in the fiber optic cable under test.

One of the objects of this invention is to provide a system for testing the transmission capabilities of fiber optic conductors.

Another object of this invention is to provide a fiber optic conductor test system employing a transmitter and a receiver, which may be separate units interconnected only by the fiber optic conductor under test.

Another object of this invention is to provide a system for testing fiber optic cables in which a test pulse and a timing pulse are transmitted simultaneously through the cable under test.

Another object of this invention is to provide a fiber optic cable testing system in which a receiver is designed to obtain a test signal and a timing pulse through a cable under test, the timing pulse being used to provide a demodulation signal for the test signal.

Other objects of this invention will be apparent to those skilled in the art in light of the following description and accompanying drawings.

SUMMARY OF THE INVENTION

In accordance with this invention, generally stated, a system for testing fiber optic conductor attenuation is provided which includes a transmitter for transmitting a test signal through the fiber optic conductor. A receiver attached to the second end of the conductor compares the transmitted signal through the conductor under test with a reference signal to obtain an error signal representation of attenuation through the conductor under test. In the preferred embodiment of the invention, the test signal includes a timing pulse having an amplitude greater than the test signal. The timing pulse is separated from the test signal in the receiver. The timing pulse is utilized in the receiver to generate a demodulation control signal which inverts a portion of the transmitted signal to provide a DC voltage representation of the transmitted signal for comparison with a reference voltage. Any difference between the reference voltage and the voltage representation of the transmitted signal is displayed as the attenuation through the conductor.

DESCRIPTION OF THE PREFERRED EMBODIMENT

Figure 1A:
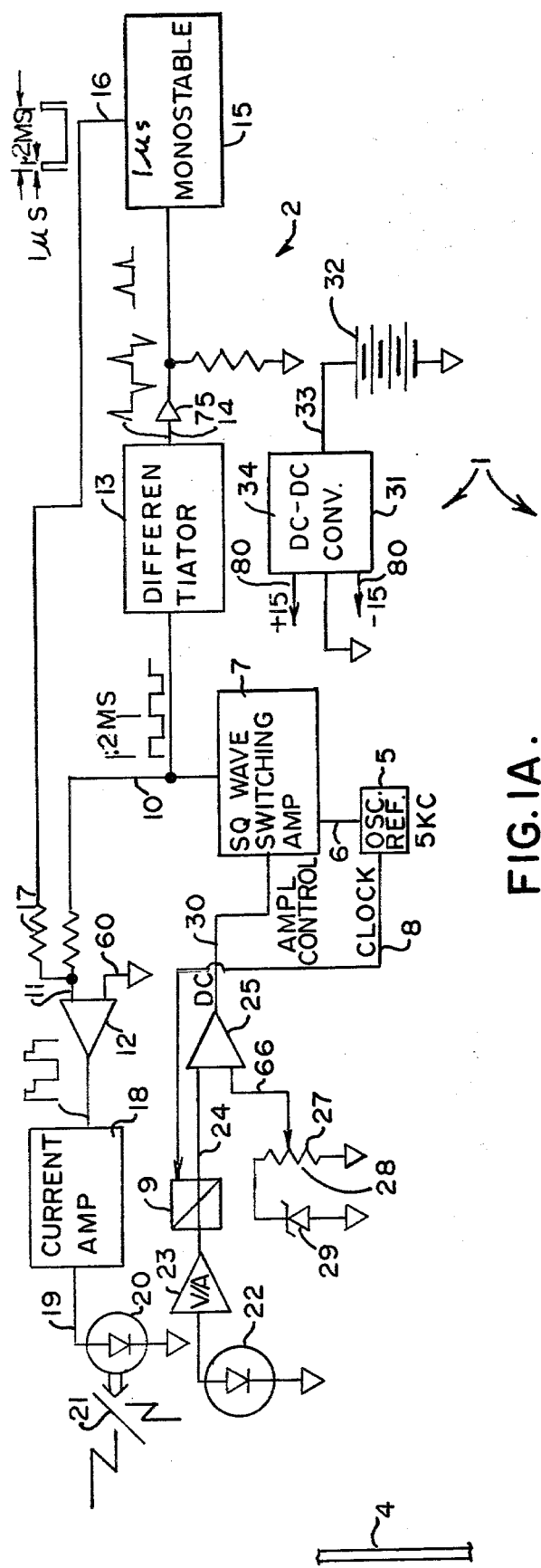
FIG. 1A is a block diagrammatic view of a transmitter for one illustrative embodiment of system for measuring attenuation of a fiber optic conductor.
Figure 1B:
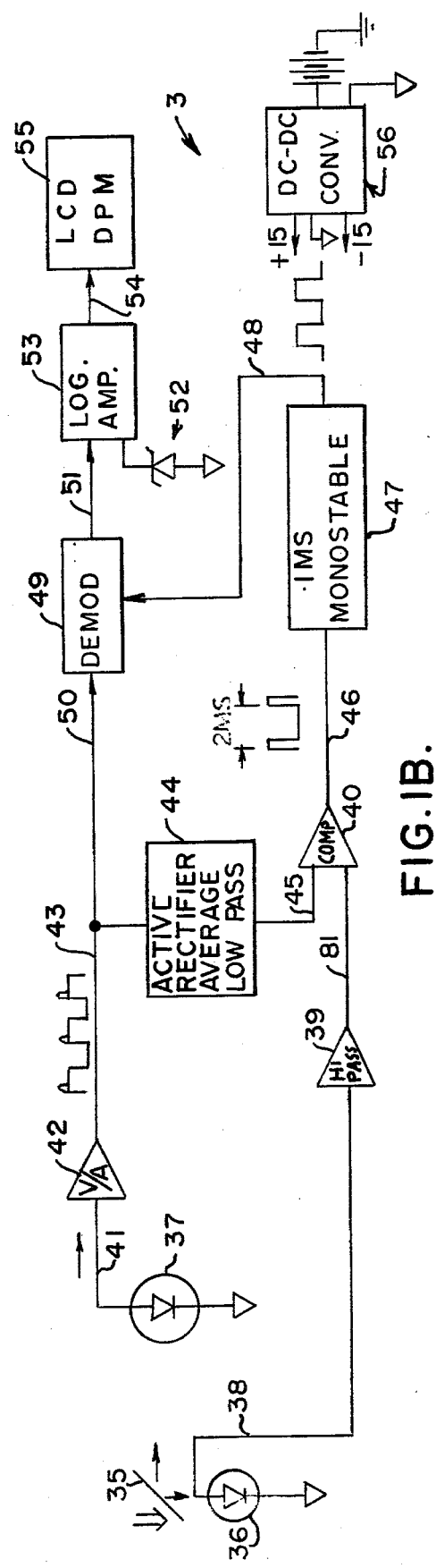
FIG. 1B is a block diagrammatic view of a receiver for one illustrative embodiment of system for measuring attenuation of a the fiber optic conductor.

Referring now to FIGS. 1A and 1B, reference numeral 1 indicates one illustrative embodiment of attenuation measuring system of this invention. The system 1 includes a transmitter 2, shown in FIG. 1A, and a receiver 3, shown in FIG. 1B. In applicational use, the transmitter 2 and receiver 3 are independently self-contained units which are operatively connected between first and second ends of a fiber optic conductor 4.

The transmitter 2 includes an oscillator means 5 having an output 6 forming an input to a square wave generator amplifier means 7. The oscillator 5 also has an output 8 forming an input to a demodulator 9, later described in greater detail.

The square wave generator 7 has an output 10 connected to a first input 11 of an amplifier 12. In the embodiment illustrated, the signal at the output 10 of the generator 7 is a square wave having a 0.2 millisecond pulse width. A differentiator 13 is operatively connected to the output 10 of the square wave generator 7. The differentiator 13 has an output 14 which passes through a diode 75 to provide an input signal of a single polarity to a one microsecond monostable multivibrator 15. The signal out of the multivibrator 15 at an output 16 is a pulse of one microsecond duration at 0.2 millisecond intervals. Output 16 is coupled to the input 11 of the amplifier 12 through a resistor 17. A second input 60 of the amplifier 12 is connected to ground.

Output of the amplifier 12 is a square wave voltage pulse having the one microsecond timing pulse superimposed on its leading edge. The output of the amplifier 12 is passed through a current amplifier means 18 having an output 19 operatively connected to a light-emitting diode 20.

The output of the light-emitting diode 20 is directed through a beam splitter 21 so that a portion of the output from the light-emitting diode 20 passes through the conduit or conductor 4 under test, while a portion of the light from the light-emitting diode 20 is directed so that it impinges a large area photodetector 22. The output of the photodetector 22 is an input to an amplifier 23 which provides an output voltage proportional to the current signal of the photodetector 22. The input 8 from the oscillator 5 is used to demodulate the signal output of the amplifier 23 in the demodulator 9 to provide a first input 24 to a D.C. voltage amplifier 25. A second input 66 of the amplifier 25 is obtained from a variable voltage source 27. The voltage source 27 includes a potentiometer 28 and a zener diode 29 arranged in a conventional manner to provide a varaible but constant source of DC voltage to the amplifier 25.

An output 30 of the amplifier 25 is fed to the square wave generator 7 and is utilized to provide amplitude control of the output 10 of the square wave generator 7. The operation of the components just described sets the power output of the light-emitting diode 20 by controlling square wave generator 7, the control being obtained by the optical feedback from the photodetector 22. This is an important feature of our invention in that the transmitter 1 is automatically compensated for anomalies occurring in the operation of the light-emitting diode 20 caused by temperature variations, or variations in a power supply 31, for example.

The power supply 31 includes a suitable battery source, for example, nickle cadium rechargeable batteries 32, which supplies power to an input 33 of DC to DC converter 34. The converter 34 provides the desired operating voltages for the transmitter 2 at an output side 80.

After passing through the conductor 4 under test, the output of the light-emitting diode 20 impinges a second beam splitter 35 which directs the output so that and a first portion impinges a high speed photodiode 36 while a second portion of the output impinges a large area photodetector 37.

An output 38 of the photodiode 36 is an input to an amplifier 39 which filters or separates the test signal from the timing pulse. An output 81 of the amplifier 39 is a first input to a comparator 40.

An output 41 of the photodetector 37 is an input to an amplifier 42 which converts the current output of the photodetector 37 to a voltage proportional to the input at its output side 43. A low pass filter rectifier means 44 is connected between the output side 43 of the amplifier 42 and a second input 45 of the comparator 40. The signal output of the amplifier 42 passes through the rectifier and low pass filter means 44 and provides an average DC reference level proportional to the test signal at the second input 45 of the comparator 40. The input 45 sets the level for the comparator 40 so that only actual timing pulses transmitted through the conductor 4 appear at an output side 46 of the comparator 40. The timing pulse thus recovered is the same one microsecond pulse at 0.2 millisecond intervals generated in the transmitter 2. The pulse forms an input to a monostable multivibrator 47. The multivibrator 47 generates a square wave at its output side 48. The output 48 of the multivibrator 47 is an input to a demodulator means 49. The demodulator means 49 also has an input 50 operatively connected to the output 43 of the amplifier 42. The output of the monostable multivibrator 47 is utilized to provide a demodulation signal which functions to enable the demodulator means 40 to invert the pulsed input from the amplifier 42 at proper times so that a DC voltage proportional to the amplitude of the test signal transmitted through the conductor 4 is available at an output side 51 of the demodulator 49.

A constant voltage reference source 52 is a first input to a Logarithmic Amplifier module means 53, while the output 51 of the demodulator means 49 is a second input thereto. The amplifier module means 53 includes suitable circuitry for comparing the reference signal from the source 52 and the received signal 51 logarithmically. It then generates an output signal 54 that is proportional to the logarithm of the ratio of the two input voltages 52 and 51. The voltage at the input 52 is chosen to the equivalent to a zero (0) db attenuation. The output signal 54 forms an input to a suitable display means 55. Display means 55 may be a liquid crystal display, for example.

Again, a suitable power supply 56 is provided to operate the receiver 3 of the system 1.

Figure 2:
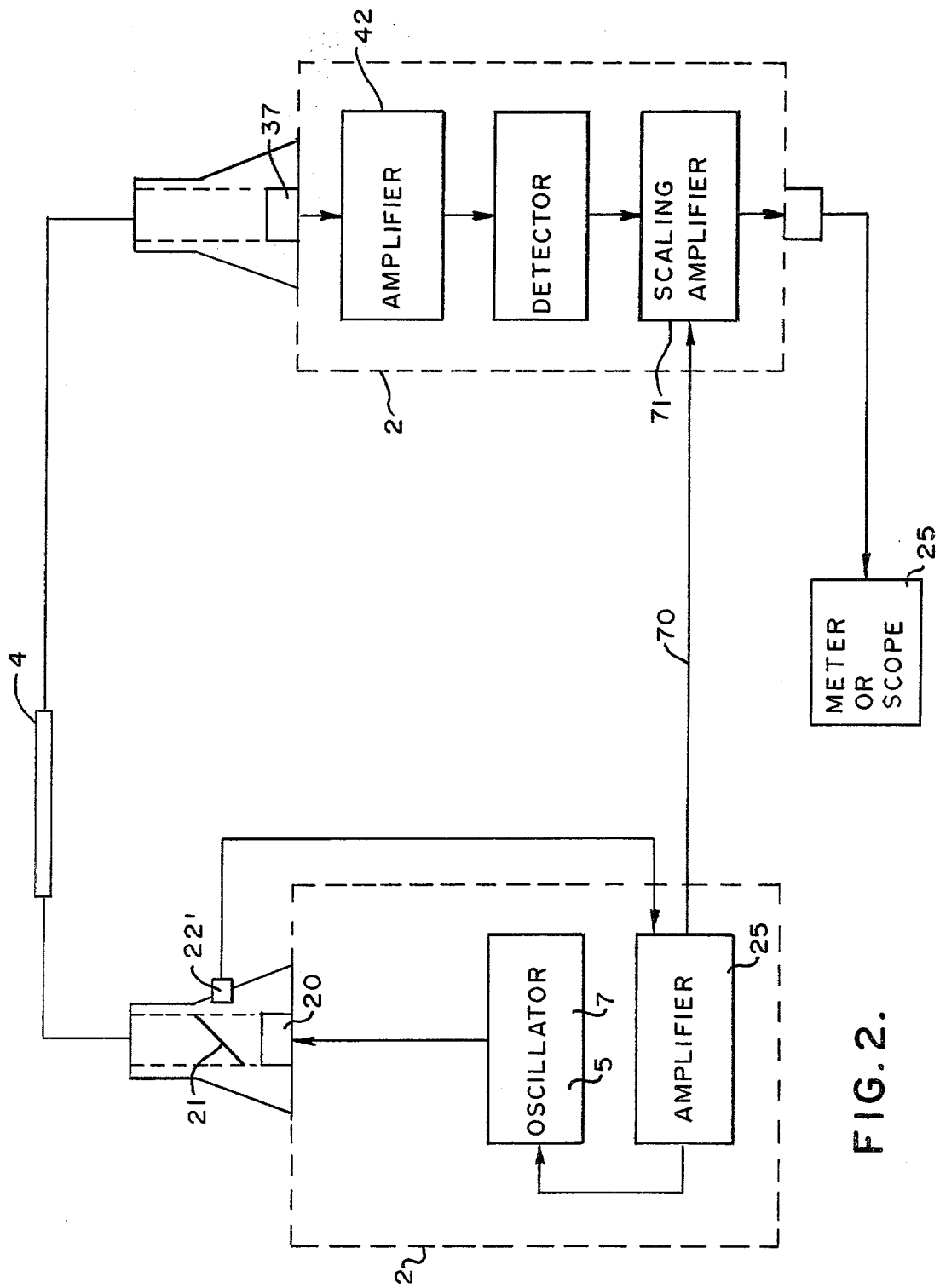
FIG. 2 is a block diagrammatic view of a second illustrative embodiment of attenuation measuring system of this invention.

FIG. 2 is a block diagrammatic view of a second illustrative embodiment of system of this invention. Like numerals are utilized to represent like parts, where approximate. The primary difference in the systems shown in FIGS. 1A, 1B and 2 is that a reference cable 70 is connected between the amplifier 25 and an amplifier 71 of the receiver 3. The signal passed through the reference conductor 70 is compared with that transmitted through the cable 4 under test in the amplifier 71, any error signal again being displayed on a display means 55. While the system shown in FIG. 2 works well for its intended purpose, the use of independent receiver and transmitter eliminates the need for the physical connection of the reference cable 70 and greatly enhances the mobility of the system 1.

It thus is apparent that a system for measuring attenuation in fiber optic conductor is provided meeting all the ends and objects herein set forth above.

Numerous variations, within the scope of the appended claims, will be apparent to those skilled in the art in light of the foregoing description and accompanying drawings. Thus, various details in circuit design may vary in other embodiments of this invention. The block diagrammatic views shown in the drawings will enable skilled practioners in the art to construct physical circuits to accomplish the descriptions set forth. Although various parameters in the form of pulse width and oscillator frequencies have been shown or described in conjunction with the operation of the circuit of this invention, these and other parameters may vary in other embodiments of the system 1. These variations are merely illustrative.

Having thus described the invention, what is claimed and desired to be secured by Letters Patent is:

1. A device for measuring the attenuation of a fiber optic cable, comprising:
   a transmitter means for generating reference signals through a fiber optic cable including means for generating a test signal, means for superimposing a timing signal on said test signal to obtain said referenced signal; and a receiver including means for receiving said referenced signal, means for recovering the timing signal, means operatively connected to the timing signal recovery means for providing a demodulating signal for the test signal, means for comparing the demodulated signal to a reference, and means for displaying any difference in said last-mentioned comparision.

2. The device of claim 1 including means for regulating the amplitude of said test signal based on the output of said transmitter.

3. The device of claim 2 further including a beam splitter at the output side of said transmitter, said beam splitter adapted to direct a portion of the referenced signal through said fiber optic cable, and for directing a portion of said referenced signal to said means for regulating the amplitude of said test signal.

4. The device of claim 2 wherein said receiver further includes a first photo diode for obtaining said timing pulse from said referenced signal, means for generating a clock pulse based on said timing pulses, and demodulator means for demodulating the transmitted pulse based on said generated clock pulse.

5. The device of claim 4 wherein said means for comparing the demodulated signal to a reference comprises means for comparing a reference signal and said test signal logarithmically.

6. A device for measuring the attenuation of a fiber optic cable, comprising:

transmitter means including means for generating a first signal, means for generating a second timing signal, and means for combining said first and second signals to obtain a test signal for transmission through said fiber optic cable at a first end thereof; and independent receiver means at a second end of said fiber optic cable including means for recovering the timing signal from said test pulse, means for providing a demodulating signal for the test pulse based on the recovered timing signal, means for comparing the demodulated signal with referenced voltage generated in said receiver, and means for displaying the result of said last mentioned comparision.

7. The device of claim 6 including means for regulating the amplitude of said test signal based on the output of said transmitter.

8. The device of claim 7 wherein said receiver further includes a first photodiode for obtaining said timing pulse from said transmitted pulse, means for generating a clock pulse based on said timing pulses, and demodulator means for demodulating said transmitted pulse based on said generated clock pulse.

9. The device of claim 8 wherein said receiver further includes a first photo diode for obtaining said timing pulse from said referenced signal, means for generating a clock pulse based on said timing pulses, and demodulator means for demodulating the transmitted pulse based on said generated clock pulse.

10. The device of claim 9 wherein said means for comparing the demodulated signal to a reference comprises means for comparing a reference signal and said test signal logarithmically.

11. The device for measuring the attenuation of a fiber optic cable, comprising:

transmitter means including means for generating a first signal, means for generating a second timing signal, means for combining said first and said second signals to obtain a test signal for transmission through said fiber optic cable, and splitter beams adapted to direct said test signal through said fiber optic cable at a first end thereof; and independent receiver means including a second beam splitter at a second end of said fiber optic cable, means for recovering said timing signal optically connected to said beam splitter, means for providing a demodulating signal for said test signal operatively connected to said timing signal recovering means, means for comparing the demodulated signal to a reference, and means for displaying the results of said comparison.

* * * * *